United States Patent [19]
Toho

[11] Patent Number: 4,719,386
[45] Date of Patent: Jan. 12, 1988

[54] PHOTOCONVERTER AND LAMP UTILIZING MULTI-QUANTUM EMISSION

[75] Inventor: Makoto Toho, Yawata, Japan

[73] Assignee: Matsushita Electric Works, Ltd., Osaka, Japan

[21] Appl. No.: 790,250

[22] Filed: Oct. 22, 1985

[30] Foreign Application Priority Data

Nov. 24, 1984 [JP] Japan ................. 59-248412

[51] Int. Cl.⁴ .................. H01J 1/62; H01J 61/42
[52] U.S. Cl. ....................... 313/485; 313/489; 427/70; 427/71; 427/64
[58] Field of Search ............ 313/112, 485, 486, 487, 313/489, 501; 427/64, 70, 71; 350/166, 373, 370

[56] References Cited

U.S. PATENT DOCUMENTS 3,707,641 12/1972 Thornton .................. 313/485 X

Primary Examiner—Leo H. Boudreau
Assistant Examiner—K. Wieder
Attorney, Agent, or Firm—Burns, Doane, Swecker & Mathis

[57] ABSTRACT

A photoconverter wherein luminous substances having at least the atomistic property are dispersed among transparent intermediate substances substantially as individually isolated and as fixed together therewith so that, upon incident light, the photoconverter is excited to cause each exciting photon to emit two or more photons for realizing multi-quantum emission.

23 Claims, 24 Drawing Figures

4,719,386

PHOTOCONVERTER AND LAMP UTILIZING MULTI-QUANTUM EMISSION

TECHNICAL BACKGROUND OF THE INVENTION

This invention relates to photoconverters and, more particularly, to a photoconverter for absorbing incident light from an irradiating source to be excited and emitting light having wavelength lower than that of the incident light on multi-quantum emission basis.

The photoconverter of the type referred to is capable of performing a multi-quantum emission with an incident light from an irradiating source for its photoconversion at a high energy efficiency, as provided, for example, on a periphery of a tube surrounding the irradiating source, that is, on the inner or outer peripheral surface of a lamp tube in an event of an elongated lamp, and thus should find its usefulness when applied to the lamps and the like.

DISCLOSURE OF PRIOR ART

An example of generally utilized photoconverters is fluorescent substance used in fluorescent lamps. In such fluorescent lamps using the fluorescent substance as a photoconverter, their luminous efficiency reaches about 80 lm/W, which is relatively high among existing lamps. From the viewpoint of energy conversion efficiency, on the other hand, the fluorescent lamp can utilize only about ¼ of the input energy. In other words, in the fluorescent lamp, about 60% of the lamp input power is converted to ultraviolet emission energy within the lamp tube and only about 40% of the ultraviolet emission energy is converted to visible light by the fluorescent substance.

To double the luminous efficiency leads the lamps directly to a remarkable energy saving, and a provision of any new photoconverter that can achieve a high luminous efficiency has been a long demand.

TECHNICAL FIELD OF THE INVENTION

A primary object of the present invention is, therefore, to provide, on the basis of a completely novel photoconverting principle, a photoconverter which can cause each exciting photon to emit two or more photons, i.e., allow a multi-quantum emission to be realized to improve the luminous efficiency remarkably and thus to achieve the energy saving to a full extent.

According to the present invention, this object can be attained by providing a photoconverter for absorbing incident light from an irradiating source to be excited and emitting light having wavelength lower than that of the incident light, wherein luminous substances substantially in the "atomistic state" (i.e. having excitation energy levels corresponding substantially to those of an isolated atom of the luminous substance) are dispersed among transparent intermediate substances substantially as individually isolated and as fixed together with the latter substances.

Other objects and advantages of the present invention shall become clear from the following description of the invention detailed with reference to preferred embodiments illustrated in accompanying drawings.

Figure 1:
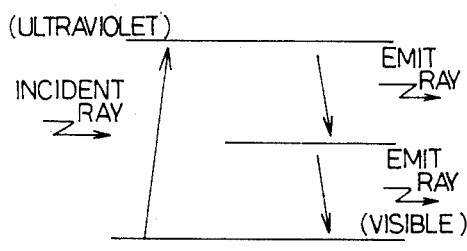
FIG. 1 is a diagram for explaining the principle of the photoconverter according to the present invention.

While the present invention shall now be described with reference to the preferred embodiments shown in the drawings, it should be understood that the invention is not to limit the invention only to the particular embodiments shown but rather to cover all alterations, modifications and equivalent arrangements possible within the scope of appended claims.

DISCLOSURE OF PREFERRED EMBODIMENTS

Figure 2:
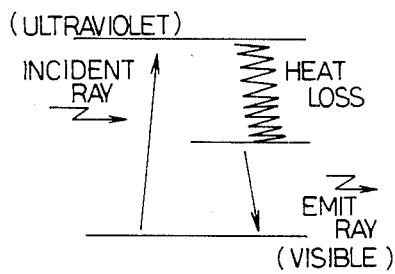
FIG. 2 is a diagram for explaining the photoconverting principle in conventional fluorescent substances shown in comparison with FIG. 1.

Referring to FIG. 1, the present invention is based on a technical idea that, upon incident of a ray from, for example, an ultraviolet irradiating source, the photoconverter of the present invention realizes an emission of two or more photons from each exciting photon (the drawing shows only two emitted photons), that is, a multi-quantum emission of two or more quanta. In such known photoconverter as fluorescent substance, on the other hand, as seen in FIG. 2, the excitation of such photoconverter upon incident of the ray causes a heat loss to occur due to a lattice vibration or the like, and there can be only an emission of single photon from each exciting photon. Accordingly, it will be appreciated that the multi-quantum emission according to the present invention is based on a completely novel light emission principle over that of the existing photoconverters, and a realization of the multi-quantum emission according to the invention enables it possible to attain a doubled luminous efficiency.

Figure 3:
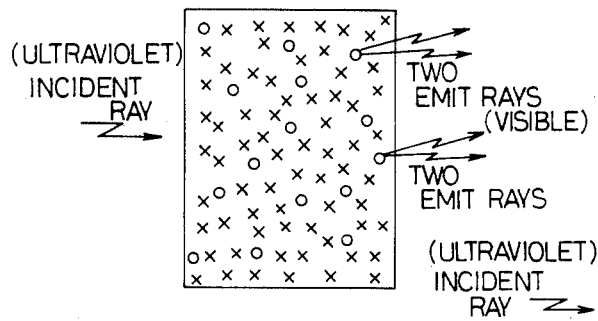
FIG. 3 is a model of the photoconverter according to the present invention.
Figure 4:
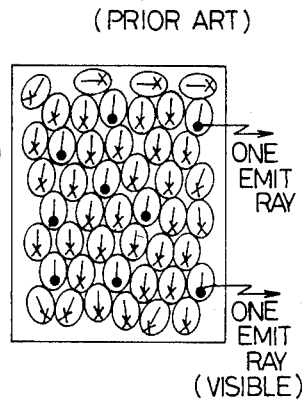
FIG. 4 is a model of conventional fluorescent substances shown in comparison with FIG. 3.

The photoconverter according to the present invention is provided in the form of a layer or a film and comprises intermediate substances, and luminous substances respectively enclosed by the former substances. Referring to a model in FIG. 3, in the photoconverter PCS of the present invention, the luminous substances EM represented by circle mark "○" are respectively dispersed in the respective transparent intermediate substances IM represented by cross mark "×", as individually isolated from each other and fixed together with the latter substance, in which the luminous substances EM maintain optimumly the properties of an isolated atom, that is, the state of atomic energy level, and at least such "atomistic" state that includes the condensed-molecular state. Here, the term "atomistic" is to refer to a state in which the luminous substance EM is not necessarily in the completely isolated atom state but at least maintains a state close to the atomic energy level state where the substance EM is merely present adjacent the intermediate substance IM without any reaction thereto or combination therewith, or is in a slight or weak combination with the substance IM and others without substantially being made to be molecular. Such retention of the luminous substances EM at least to be "atomistic" allows that, upon presence of an incident ray onto the photoconverter PCS from an irradiating source, two or more photons are emitted from the respective luminous substances ES dispersed in the intermediate substances IM, in the photoconverter PCS. In the fluorescent substance as a conventional photoconverter which is in the form of a layer or a film, as shown by such a model as in FIG. 4, on the other hand, it is considered that an element represented by the cross mark "×" in each matrix molecule denoted by a symbol —× is substituted by a luminous contributing element represented by dot "•" to form luminous molecules represented by —•, which are disposed as dispersed among respective transparent non-luminous matrix molecules —×. In this case, the luminous contributing element "•" in the luminous molecules —• has only an exciting energy level for the molecule which is far from the energy level for the atom or atomistic state so that, in the fluorescent substance, only a single photon will be emitted from the respective luminous molecules having the luminous contributing elements upon incident of ray from the irradiating source to the fluorescent substance.

Figure 5:
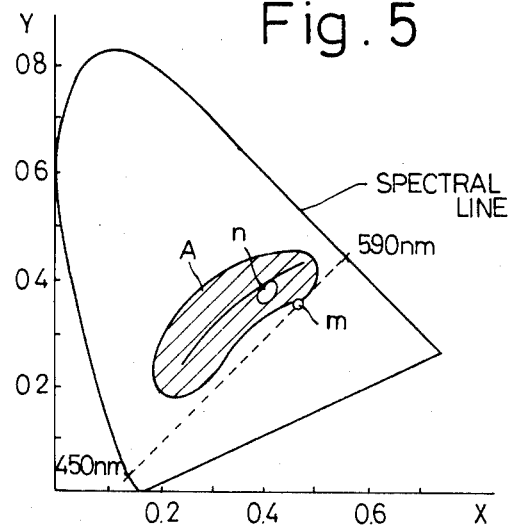
FIG. 5 is an X-Y chromaticity diagram.

In obtaining a light emission for illumination purpose in practice, on the other hand, it is preferable that the emitted light is white, which is, as shown by the chromaticity, in a zone A hatched in a diagram of FIG. 5 as has been known.

Figure 6:
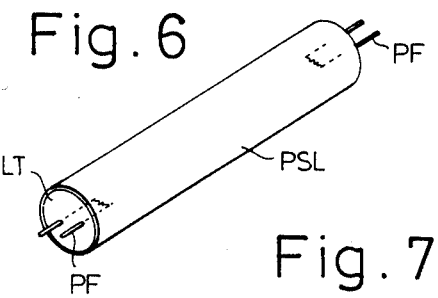
FIG. 6 is a schematic perspective view of a lamp to which the photoconverter of FIG. 3 is applied in an embodiment of the present invention.
Figure 7:
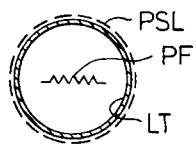
FIG. 7 is a sectional view of the lamp of FIG. 6.
Figure 8:
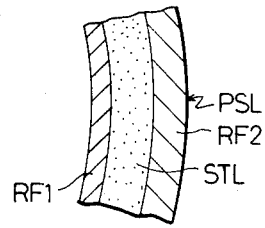
FIG. 8 is a partial sectional view as magnified of the photoconverter in the lamp of FIG. 6.

The photoconverter according to the present invention will be explained with reference to an embodiment in which the photoconverter is applied to an illumination lamp tube. Referring to FIGS. 6 to 8, there is shown such a low-pressure mercury discharge lamp permeable to ultraviolet ray as a germicidal lamp, in which a lamp tube LT having preheating electrodes PF is provided either on the inner or outer peripheral surface with a filmy photoconverter layer PSL which includes, as shown in section of FIG. 8, a solid thin layer STL comprising Na as one of utilizable luminous substances, Na being arranged as fixed to a base that forms the intermediate substances IM while maintaining the atomistic state. The solid thin layer STL is coated on its rear surface with a resin film RF1 permeable to the ultraviolet ray and on its front surface with a resin film RF2 permeable to visible light.

Figure 9A:
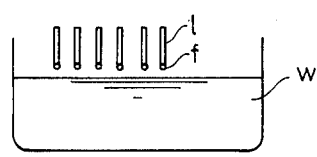
FIGS. 9A to 9C are schematic diagrams for explaining steps for forming the photoconverter in FIG. 6 according to a Langmuir film forming method.
Figure 9B:
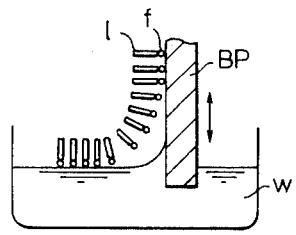
Figure 9C:
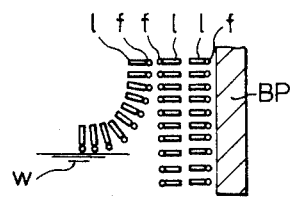
Figure 10:
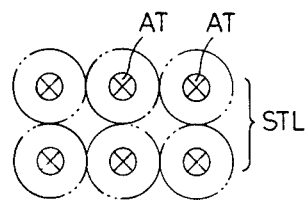
FIG. 10 is a schematic diagram showing the structure of the photoconverter made through the steps of FIG. 9.

In forming the solid thin layer STL of the photoconverter layer PSL in the above, it may be possible to employ any working technique selected as a utilizable one from the Langmuir film forming method, ultrafine particle forming method, superalloy forming method, ultrathin film forming method and the like. Referring now to an example in which the Langmuir film forming method is employed, such molecules as stearic acid [$CH_3(CH_2)_{16}COOH$] are immersed into water "w" first, and then there is formed on the surface of water a molecular layer of a single thin film, with hydrophilic group "f" of the molecules disposed on the side of water but with their hydrophobic group "l" disposed away from water, as shown in FIG. 9A. When, next, an adequate substrate BP of a resin or the like is immersed into and pulled out of water "w" as shown in FIG. 9B, the molecular layer is caused to stick to the substrate BP. This procedure is repeated and a plurality of the molecular layers are formed on the substrate BP as shown in FIG. 9C.

By applying substances including such luminous-matrix metallic element as Na as well as a chemical treatment with respect to the molecular layers thus formed on the substrate BP, the molecular layers are caused to react so as to form a metallic salt. Thereafter, the metallic salt is reduced through a reduction step to neutralize ionized metal into a neutral metal, and the solid thin layer STL capable of realizing such multi-quantum light emission as mentioned above can be prepared in which Na atoms AT are fixed while maintaining their atomistic state, with respect to the transparent intermediate substances IM which can be formed by such substrate BP as light-permeable resin, the atoms being therein disposed to be substantially independent of each other.

Figure 12:
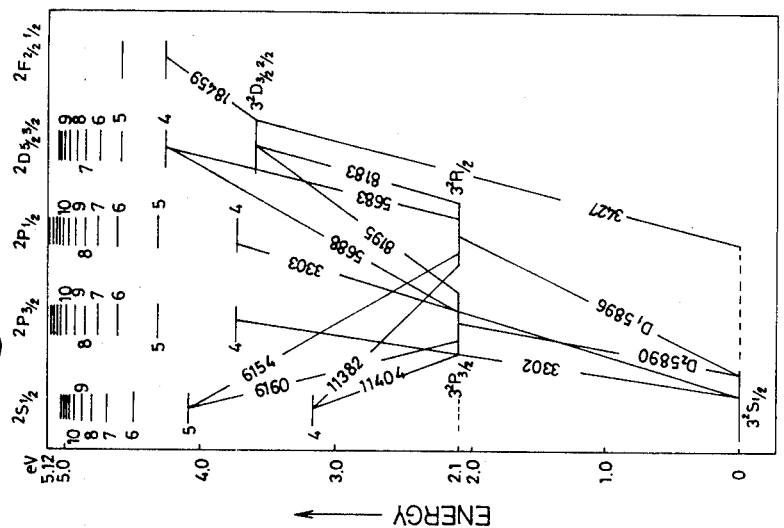
FIG. 12 is an energy level diagram of Na which can be used as a luminous substance in the photoconverter in FIG. 6.
Figure 11:
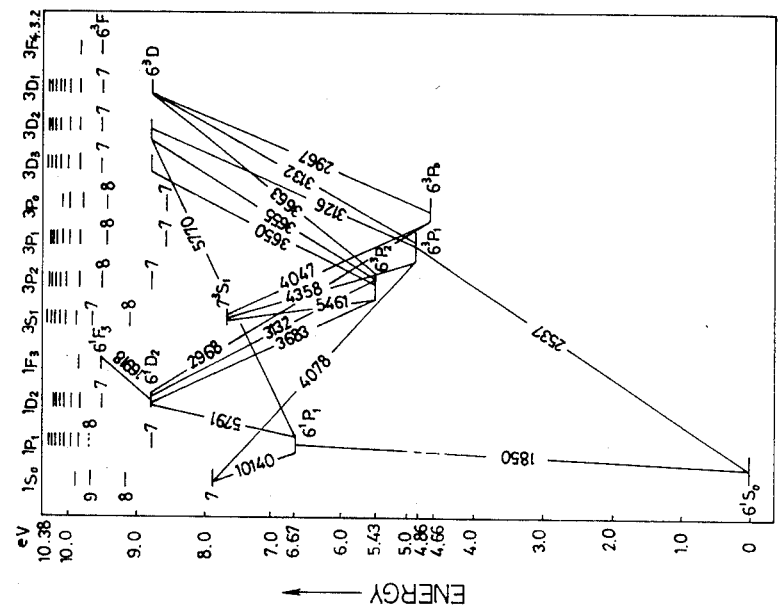
FIG. 11 is an energy level diagram of Hg for mercury discharge lamp as one of irradiating sources applicable to the photoconverter in FIG. 6.

In this lamp tube LT having the photoconverter layer PSL including the solid thin layer STL, the most part of light emitted by Hg is ultraviolet light of 254 nm (2537Å) in a low-pressure discharge zone nearly at 40° C. as will be clear from FIG. 11 showing the atomic energy level of Hg, whereas Na emits mainly two resonant emissions in yellow in the vicinity of 590 nm as will be clear from the atomic energy level thereof in FIG. 12 and many visible emission spectra appear as the excitation becomes higher so that, when mercury discharge takes place, mainly the 254 nm ultraviolet ray will be caused to be incident on the solid thin layer STL through the tube LT and resin film RF1 in the tube LT. In the solid thin layer STL in which Na maintains the atomistic state, the incident ultraviolet ray is thereby absorbed and Na is excited at the higher level. In this case, it is considered that, since 254 nm energy corresponds to about 4.9 eV, the excitation level of Na atoms concentrates, in the probability, to such higher levels as $^2S_{\frac{1}{2}}$, $^2P_{3/2}$, $^2P_{\frac{1}{2}}$, $^2D_{5/2}$, $^2D_{3/2}$ or the like series. A transition due to the emission takes place from the respective excitation levels to their predetermined lower or basic level, and it is highly probable that the transitions due to the emission is subjected to such control as follows. That is, such higher order transistions as $9^2S_{\frac{1}{2}} \rightarrow 3^2P_{3/2}$, $3^2P_{\frac{1}{2}}$ and $^2D_{5/2}$, $^2D_{3/2} \rightarrow 3^2P_{3/2}$, $3^2P_{\frac{1}{2}}$ takes place with a high probability so that an energy difference from $3^2P_{3/2}$ and $3^2P_{\frac{1}{2}}$ is about 2.8 eV, whereby the emitted light is made to have a wavelength of about 450 nm. Further higher order transitions $^2P_{3/2}$, $^2P_{\frac{1}{2}} \rightarrow 3^2S_{\frac{1}{2}}$ (basic level) is made substantially to a re-emission of absorbed ray so as to be an ultraviolet ray of about 254 to 260 nm and, as absorbed again, is caused to be excited eventually to higher orders of $S_{\frac{1}{2}}$, $D_{5/2, 3/2}$.

With transitions $3^2P_{3/2}$, $3^2P_{\frac{1}{2}} \rightarrow 3^2S_{\frac{1}{2}}$ (basic level) due to secondary emission, next, there is emitted a D ray (yellow) of about 590 nm (about 2.1 eV). In this case, a quantity ratio of blue light emission around 450 nm to yellow light emission around 590 nm is approximately 1:1, and after visibility correction the chromaticity of this two-quantum emission will be close to a point "m" in FIG. 5. Eventual chromaticity after an addition of the visible light due to the mercury discharge corresponds nearly to a spot "n" within the white zone A, and the photoconverter of the present invention can provide a luminous efficiency of about 160 lm/w that is about a double valve of the luminous efficiency of 80 lm/w of the known fluorescent substance.

Several other luminous substances may be used in the solid thin layer STL of the photoconverter according to the present invention. When, for example, strontium Sr is used to form the solid thin layer STL, Sr is collected by, for example, a metal absorbing chelate resin in such that

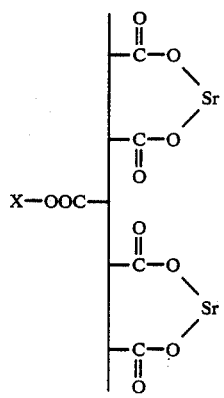

and is thereafter reduced with hydrogen gas or other proper reducing agent to be

Figure 13:
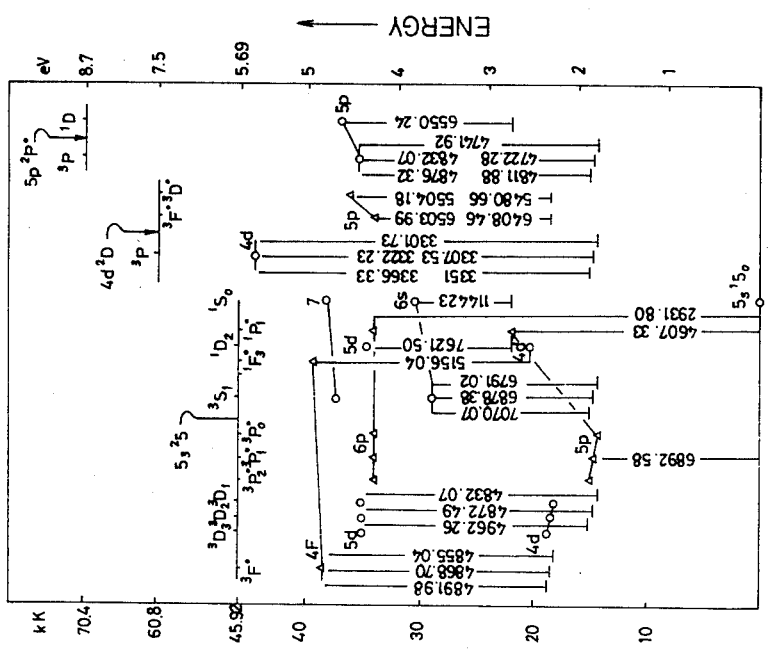
FIG. 13 is an energy level diagram of Sr which can be used as another luminous substance in the photoconverter in FIG. 6.

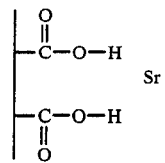

whereby Sr is extracted and fixed as a neutral atom as enclosed in a molecular structure space. In this case, the discharge of low-pressure mercury discharge lamp will cause Sr in the solid thin layer STL to absorb the incident ray to be excited by the ultraviolet radiation because carboxyl group is permeable to visible and ultraviolet rays, in which event Sr is effectively excited to a higher energy level of 5P and transferred from this level to 4d level while emitting light of 655 nm spectrum and then to the basic level with an emission of light of 461 nm spectrum, as will be clear from a Sr energy level diagram of FIG. 13.

Figure 14:
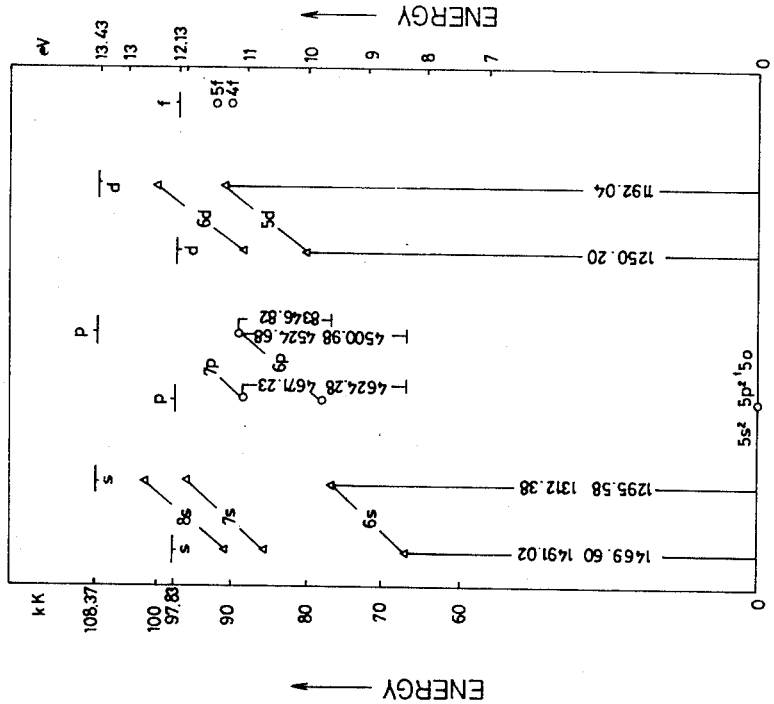
FIG. 14 is an energy level diagram of Xe for xenon discharge lamp as another irradiating source applicable to the photoconverter in FIG. 6.
Figure 15:
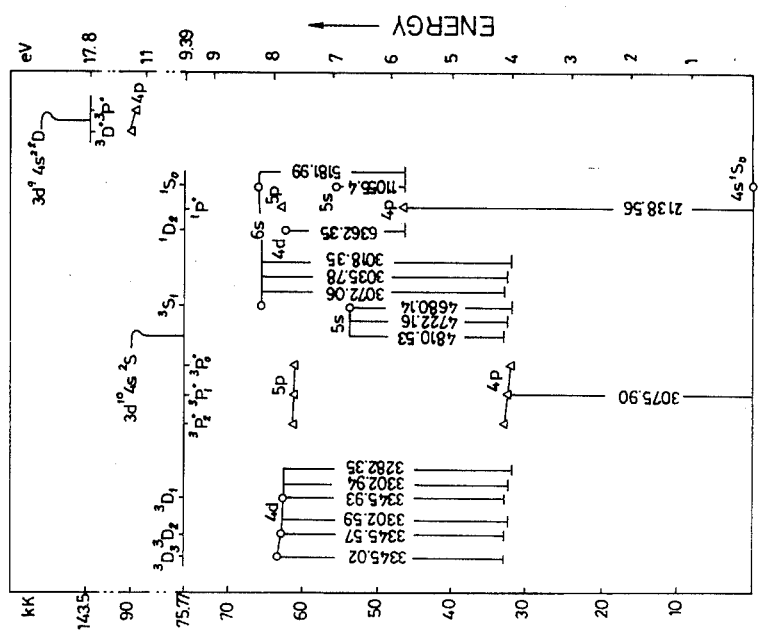
FIG. 15 is an energy level diagram of Zn which can be used as stil another luminous substance in the photoconverter in FIG. 6.

As the irradiating source for the photoconverter, it is possible to employ other substances in the present invention. For example, xenon Xe having such energy level as in FIG. 14 may be used, in combination with Zn having the energy level of FIG. 15 and employed as the luminous substance in the solid thin layer STL of the photoconverter. Xenon discharge causes an irradiation of ultraviolet having a wavelength of about 147 nm and an energy of about 8.2 eV, which light is absorbed by Zn to strongly excite it to 4d level. A further transition immediately occurs from this level to a lower level 4P while emitting light of about 330 nm spectrum and then to the basic level with a light emission of about 300 spectrum. In this manner, the far ultraviolet irradiation of 147 nm can be efficiently converted to near ultraviolet ray of about 300 to 330 nm through the two-quantum emission.

Figure 17:
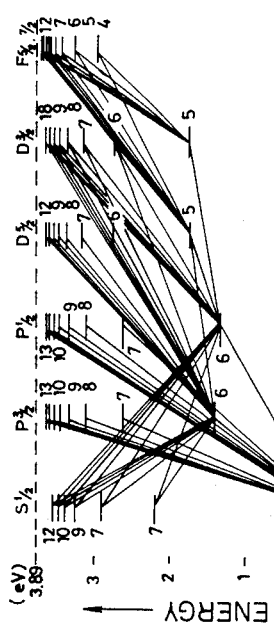
FIG. 17 is an energy level diagram of Cs which can be used as a further luminous substance in the photoconverter in FIG. 6.
Figure 16:
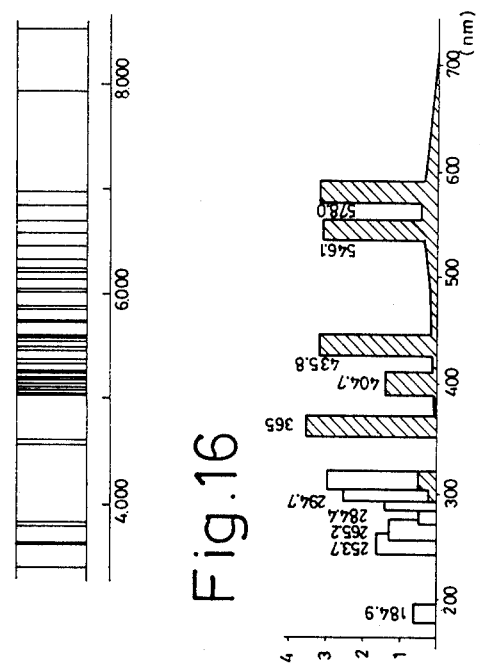
FIG. 16 is a spectrum diagram of a high-pressure mercury discharge lamp as a further irradiating source applicable to the photoconverter in FIG. 6.

Further, the high-pressure mercury discharge may be used as the irradiating source with respect to the photoconverter of the present invention, and cesium Cs may be used in the solid thin layer STL, the spectrum of the high-pressure mercury discharge being shown in FIG. 16 and the energy level of Cs being shown in FIG. 17. In this case, the high-pressure mercury discharge irradiates near ultraviolet rays of about 365 nm (about 3.4 eV) and visible rays of 405 nm (about 3.1 eV), 436 nm (about 2.9 eV) and 546 nm (about 2.3 eV), which rays are absorbed by Cs. Cs atoms have exciting levels which are all close to 365 nm as seen in FIG. 17 so that they will effectively absorb the irradiated rays and emit yellow light of about 2.1 eV and infrared ray of about 1.3 eV in two stages with a resonance energy level of about 1.3 eV disposed between them. Similarly, with the visible ray of 405 nm, a red light emission of about 1.8 eV and infrared light emission of about 1.3 eV take place and, with the ray of 436 nm, a two-quantum emission of infrared rays of about 1.4–1.5 eV and about 1.3 eV takes place.

In addition, such low-pressure mercury discharge lamp as the germicidal lamp is made utilizable as the irradiating source with respect to the photoconverter of the invention, with a use of lithium Li in the solid thin layer STL. In this case, the mercury discharge irradiates 254 nm ultraviolet ray which is highly efficiently absorbed by Li to excite it for an emission of blue light of 427 nm, the exciting level of which is thereafter transferred to the basic level, giving off a 671 nm red light. In this case, optimumly, Li is provided on the solid thin layer STL in a flimy form substantially in the same manner as in the case of Na. This photoconverter PSL employing Li as the luminous substance is particularly useful when used for providing an artificial light to plants which are to be exposed to daylight during the daytime and to the artificial light at night for their forcing cultivation. It has been found that effective wavelength bands for promotion of plant growth reside in 400–500 nm of blue light and 600–700 nm of red light, to which the wavelengths of two-quantum emissions by the Li-containing photoconverter are conforming.

Figure 18:
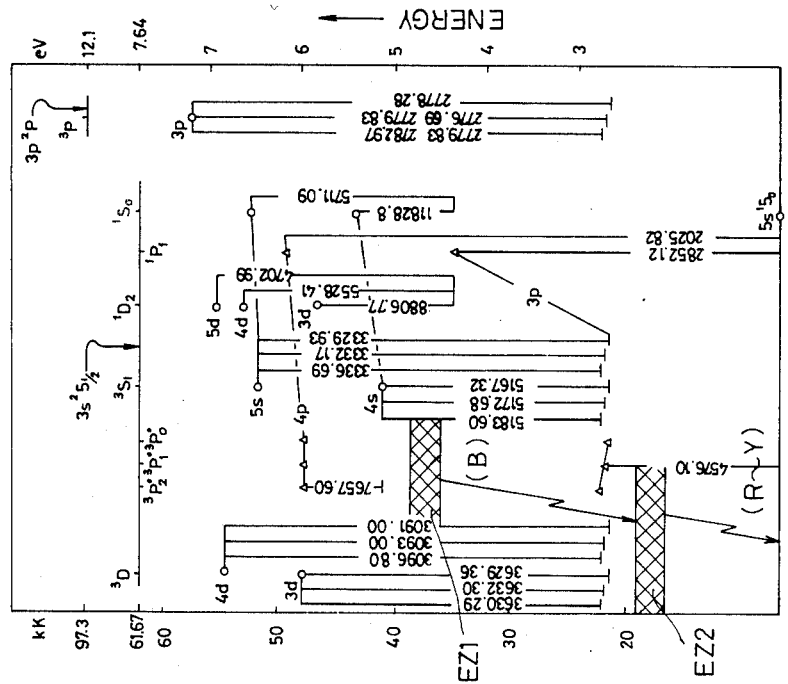
FIG. 18 is an energy level diagram of Mg which can be used in the atomistic state as still another luminous substance in the photoconverter in FIG. 6.
Figure 19:
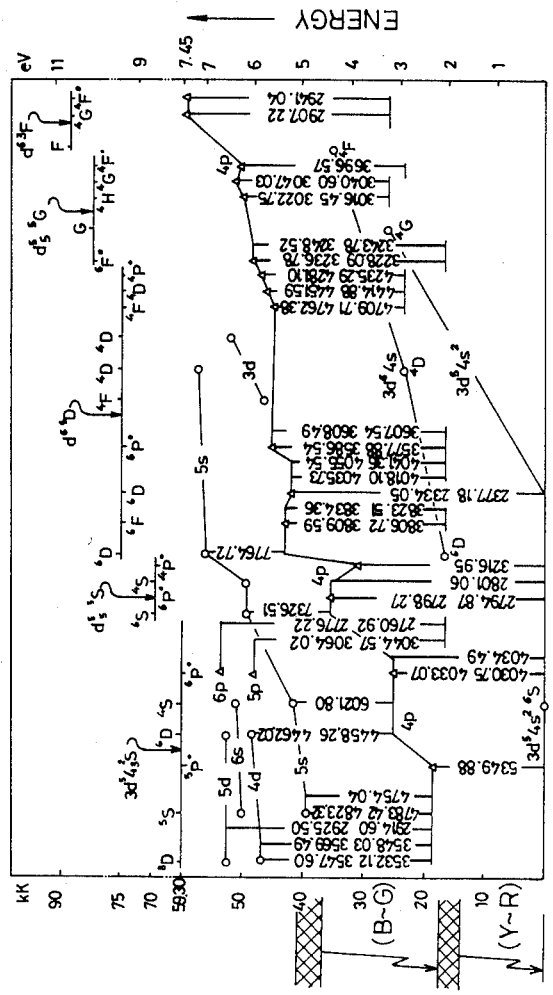
FIG. 19 is an energy level diagram of Mn which can be used in the atomistic state as a still further luminous substance in the photoconverter in FIG. 6.

Further, it is considered likely that the independency and isolation of atoms in the luminous substances of the solid thin layer STL in the photoconverter PSL of the present invention are caused to be deteriorated due to an application of certain chemical or physical force or both. In such event, a coupling force in the order of several tenths of an electron volt eV is expected to act on the luminous substances, and it will be effective to employ the low-pressure mercury discharge lamp as the irradiating source, together with Mg having the energy level of FIG. 18 or Mn having the energy level of FIG. 19 as used in the solid thin layer STL, taking into consideration the particular coupling force with respect to the incident ultraviolet ray of 254 nm. When the coupling force of several tenths of an electron volt acts on, for example, Mg, the level of 4S will drop slightly below 4.9 eV with some extent of fluctuation as shown by a cross-hatched zone in FIG. 18 so that somewhat broader blue spectrum (B) will appear, while also in the lower exciting level the similar drop takes place with some fluctuation as shown by another cross-hatched zone in the drawing so that somewhat broader yellow-to-red spectrum (Y-R) will appear, whereby a composite white light more favourable may be obtained as the matter of coloration. Similarly, in the case of Mn, the coupling force of several tenths of eV acting thereon causes the level 5S to drop slightly below 5.0 eV with a slight extent of fluctuation as shown by a cross-hatched zone on left side of FIG. 19 so that somewhat broader blue-to-green spectrum (B-G) will appear, while the lower exciting level is also caused to drop as shown by another cross-hatched zone in the drawing so that slightly broader red-to-yellow spectrum (R-Y) will appear, and thus a favourable composite white light is made to appear in similar manner as in the case of Mg.

Figure 20:
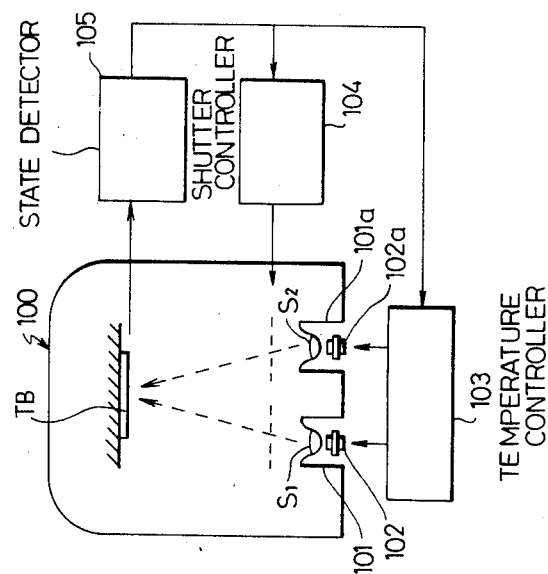
FIG. 20 is a schematic diagram for explaining a method of forming the photoconverter in FIG. 6 according to a vacuum deposition technique.
Figure 21:
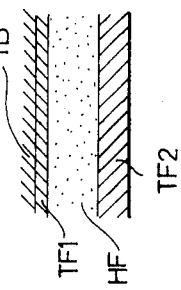
FIG. 21 is a fragmentary section for explaining the structure of a photoconverter made according to the method of FIG. 20.

References shall be made next to an example in which the vacuum deposition method is utilized for forming the photoconverter layer PSL according to the present invention. Referring to FIGS. 20 and 21, in the vacuum deposition, a proper transparent base TB is placed within a vacuum bell jar 100, in which crucibles 101 and 101a containing respectively a deposition source $S_1$ of such luminous substance as Na and a deposition source $S_2$ of a material inactive to such luminous substance as Na as well as air and water and permeable to visible rays are disposed. Heating operation by means of heaters 102 and 102a of the crucibles 101 and 101a is controlled by a temperature controller 103, and evaporating amount of substances from the deposition sources $S_1$ and $S_2$ is properly adjusted by a shutter represented by a horizontal dotted line and controlled by a shutter controller 104, while the controllers 103 and 104 are activated by outputs from a state detector 105 which monitors the state of substances deposited on the base TB. The deposition source $S_2$ is first vaporized and deposited on the base TB to form a thin layer TF1 thereon. Then, the luminous-substance deposition source $S_1$ is vaporized and deposited on the layer TF1 in such ratio that the density ratio between the deposited substances from the sources $S_1$ and $S_2$ becomes optimum so that the luminous substances from the source $S_1$ in the state of atom or at least maintaining the "atomistic" state will disperse in the deposited substances from the source $S_2$ which forming the intermediate substances and a hybrid layer HF having such a model structure as shown n FIG. 3 will be formed. Subsequently, only the substances from the source $S_2$ are vaporized and deposited on the hybrid layer HF to form a further thin layer TF2, and thereby the photoconverter layer is formed on the base TB.

Figure 22:
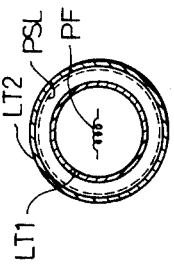
FIG. 22 is a schematic sectional view explaining another embodiment in which the photo-converter of FIG. 3 is applied to the lamp.

The photoconverter according to the present invention arranged as has been disclosed can be applied to various objects and to any lamp other than those of FIGS. 6 and 7. As shown, for example, in FIG. 22, two lamp tubes LT1 and LT2 may be coaxially arranged and the outer tube LT2 may be provided on the inner peripheral surface with the photoconverter layers PSL, while the electrodes PF are disposed in the inner tube LT1.

What is claimed as my invention is:

1. A photoconverter for absorbing incident light from an irradiating source to be excited and emitting light having a wavelength lower than that of said incident light, wherein luminous substances are dispersed among transparent intermediate substances permeable to visible light, said luminous substances being substantially disposed to be individually independent of each other and as fixed along with said intermediate substances, said luminous substances having excitation energy levels corresponding substantially to those of isolated atoms of the luminous substances, the excitation of an atom of the luminous substances producing a multi-quantum emission of photons substantially in the visible spectrum from said atom.

2. A photoconverter according to claim 1, wherein said luminous substances are of a metal, and said photoconverter is formed in a solid thin layer.

3. A photoconverter according to claim 2, which further comprises a first film coated on one surface of said solid thin layer and permeable to ultraviolet rays, and a second film coated on the other surface of the layer and permeable to visible rays.

4. A photoconverter according to claim 1, wherein said luminous substances are of a metal selected from the group consisting of Na, Li and Sr.

5. A photoconverter according to claim 1, wherein said luminous substances are of a metal selected from one group consisting of Mg, Mn, Cs and Zn.

6. A lamp comprising a lamp tube including a photoconverter for absorbing incident light from an irradiating source to be excited and emitting light having a wavelength lower than that of said incident light, wherein said photoconverter is provided on said tube in the form of a solid thin film in which luminous substances are dispersed among transparent intermediate substances permeable to visible rays, said luminous substances being substantially disposed to be individually independent of each other and as fixed along with said intermediate substances, said luminous substances having excitation energy levels corresponding substantially to those of isolated atoms of the luminous substances, the excitation of an atom of the luminous substances producing a multi-quantum emission of photons substantially in the visible spectrum from said atom.

7. A lamp according to claim 6, wherein said solid thin film is attached onto an outer peripheral surface of said lamp tube.

8. A lamp according to claim 6, wherein said solid thin film is attached onto an inner peripheral surface of said lamp tube.

9. A lamp according to claim 7, wherein said solid thin film has a resin film permeable to ultraviolet rays and adhered to the inner surface of the film, and a film coating permeable to visible rays and adhered to the outer surface of the film.

10. A lamp according to claim 6, wherein said irradiating source is a low-pressure mercury discharge lamp, and said luminous substances are of a metal selected from the group consisting of Na, Li and Sr.

11. A lamp according to claim 6, wherein said irradiating source is a low-pressure mercury discharge lamp, and said luminous substances are of a metal selected from the group consisting of Mg, Mn, Cs and Zn.

12. A lamp according to claim 6, wherein said irradiating source is a rare gas discharge lamp, and said luminous substance is of a metal.

13. A lamp according to claim 12, wherein said discharge lamp is a xenon discharge lamp and said metal is zinc.

14. A photoconverter according to claim 1, wherein said luminous substances are dispersed among the transparent intermediate substances by way of a langmuir film forming method.

15. A photoconverter according to claim 1, wherein said luminous substances are dispersed among the transparent intermediate substances by way of an ultrafine particle forming method.

16. A photoconverter according to claim 1, wherein said luminous substances are dispersed among the transparent intermediate substances by way of a superalloy forming method.

17. A photoconverter according to claim 1, wherein said luminous substances are dispersed among the transparent intermediate substances by way of an ultrathin film forming method.

18. A photoconverter according to claim 1, wherein said luminous substances are dispersed among the transparent intermediate substances by way of a vacuum deposition method.

19. A lamp according to claim 6, wherein said luminous substances are dispersed among the transparent intermediate substances by way of a langmuir film forming method.

20. A lamp according to claim 6, wherein said luminous substances are dispersed among the transparent intermediate substances by way of an ultrafine particle forming method.

21. A lamp according to claim 6, wherein said luminous substances are dispersed among the transparent intermediate substances by way of a superalloy forming method.

22. A lamp according to claim 6, wherein said luminous substances are dispersed among the transparent intermediate substances by way of an ultrathin film forming method.

23. A lamp according to claim 6, wherein said luminous substances are dispersed among the transparent intermediate substances by way of a vacuum deposition method.

* * * * *